(12) United States Patent
Gheesling et al.

(10) Patent No.: US 8,051,577 B1
(45) Date of Patent: Nov. 8, 2011

(54) METHODS AND APPARATUS FOR INSTALLATION OF FASTENERS

(75) Inventors: Samuel Edward Gheesling, Bothell, WA (US); Mitchel A. Arndt, Auburn, WA (US); Karen Chivono Takatani, Renton, WA (US); William F. Vanderberg, Covington, WA (US); Darren R. Kukuk, Tacoma, WA (US); Michael Flores, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/841,755

(22) Filed: Jul. 22, 2010

(51) Int. Cl.
G01B 3/14 (2006.01)
(52) U.S. Cl. ......................................................... 33/563
(58) Field of Classification Search ................... 33/562, 33/563, 565, 566, 613, 645
See application file for complete search history.

(56) References Cited

U.S. PATENT DOCUMENTS

| | | | |
|---|---|---|---|
| 4,489,500 A * | 12/1984 | Valat | 33/562 |
| 4,507,889 A | 4/1985 | Allen | |
| 5,634,904 A | 6/1997 | Battenfield | |
| 5,671,641 A | 9/1997 | Stephenson, Jr. | |
| 6,643,945 B1 * | 11/2003 | Starks | 33/566 |
| 2009/0255140 A1 * | 10/2009 | Page | 33/563 |
| 2010/0207945 A1 * | 8/2010 | Kirsch | 33/562 |
| 2010/0313437 A1 * | 12/2010 | Cherchio | 33/562 |

OTHER PUBLICATIONS

Cheldelin, B. et al; Mixed Model Assembly Quality: An Approach to Prevent Human Errors; Proceedings of IMECE'04 2004 ASME International Mechanical Engineering Congress & Exposition; Nov. 13-19, 2004; Anaheim, CA USA; pp. 1-11.

* cited by examiner

*Primary Examiner* — G. Bradley Bennett
(74) *Attorney, Agent, or Firm* — Armstrong Teasdale LLP (57) ABSTRACT

An apparatus for positioning of fasteners normal to a surface through which the fasteners are to be inserted is described. The apparatus includes a sheet of material comprising a plurality of holes therethrough, where the holes are positioned to correspond with bores through the surface through which the fasteners are to be inserted, and a plurality of grommets. The grommets are operable for mounting in the holes in said sheet. Each grommet includes a hole centered therein and sized such that the grommet will support a fastener placed therein, and a plurality of radial keyways extending from the centered hole, the keyways having a specific radial depth to provide finger tabs at the centered hole to maintain support of the corresponding fastener normal to the sheet.

19 Claims, 8 Drawing Sheets

METHODS AND APPARATUS FOR INSTALLATION OF FASTENERS

BACKGROUND OF THE INVENTION

The field of the invention relates generally to fastener installation, and more specifically, to a template that aids in the installation of fasteners.

It is almost always desirable to increase efficiency of a workplace. As such, engineering and other personnel are often charged to find solutions that increase efficiency of such workplaces.

As far as existing solutions for fastener installation, an original solution was to utilize no shop aids, and to install the individual fasteners by hand. In an aircraft, there are literally tens of thousands of such fasteners and hand installation is inefficient. To increase efficiency of fastener installation over the hand installation method, a fastener template was developed. This first-generation template, which is currently utilized in several manufacturing programs, consists of a triplex template of two outer polyurethane layers and one rubber layer between the outer layers. Fasteners are retained in holes through the polyurethane and are seated through the rubber layer and held generally in place in a relief hole passing through the rubber layer.

Disadvantages and limitations are known with the existing solutions. For example, when installing the fasteners by hand, human errors do occur. As such, one manufacturing process step is to ensure that the fastener installation matches the configuration defined by engineering. It is therefore easy to understand that hand loaded fasteners may be a source of error. Hand loading can result in dropped fasteners which may cause further human errors.

The fastener templates that utilize the rubber layer, while an improvement over the hand installation method, are not capable of holding fasteners in proper alignment, for example, a normal-to-surface alignment. This problem is exacerbated if more than one row of fasteners is incorporated into the template. Further, when the rubber sheet of this template has to be replaced due to wear, the replacement cannot be done on the shop floor. The template is sent to a repair facility to ensure that once repaired, it meets the configuration requirements of such a template.

BRIEF DESCRIPTION OF THE INVENTION

An apparatus for positioning of fasteners normal to a surface through which the fasteners are to be inserted is provided. The apparatus includes a sheet material comprising a plurality of holes therethrough, where the holes are positioned to correspond with bores through the surface through which the fasteners are to be inserted, and a plurality of grommets. The grommets are operable for mounting in the holes in said sheet. Each grommet includes a hole centered therein and sized such that said grommet will support a fastener placed therein, and a plurality of radial keyways extending from the centered hole, the keyways having a specific radial depth to provide finger tabs at the centered hole to maintain support of the corresponding fastener normal to the sheet.

In another aspect, a method for installing fasteners into an assembly, the assembly including a plurality of bores formed therein in a specific orientation with respect to one another into which the fasteners are to be inserted is provided. The method includes placing individual fasteners into corresponding ones of a plurality of grommets, the grommets installed into holes formed in a flexible sheet material, the plurality of grommets alignable with the plurality of bores, the grommets and flexible sheet material forming a template, at least partially engaging each fastener with a corresponding bore in the assembly, and removing the template such that heads associated with the fasteners pass through the corresponding grommet, leaving the individual fasteners in position for final installation into the assembly.

In still another aspect, a fastener positioning apparatus is provided that includes a sheet material comprising a plurality of holes therethrough, which are positioned to correspond with bores through the surface through which the fasteners are to be inserted, and a plurality of grommets. The grommets are operable for mounting in the holes in the sheet. The grommets each have a hole centered therein which is sized such that each grommet will support a fastener placed therein in a position substantially normal to the sheet.

DETAILED DESCRIPTION OF THE INVENTION

A fastener template is described which is intended to ease, as well as increase the speed of fastener installation. The described embodiments increase fastener type accuracy and help to eliminate dropped fasteners. In addition, the described template reduces defects in a finished product that may be caused by tool marks. The described template, in embodiments, includes a single sheet of plastic, for example, a polycarbonate sheet, (e.g, MaKrolon® which is a trademark of Bayer MaterialScience AG Group) holding an array of elastomeric grommets, where the individual fastener are held in place by the corresponding grommet. The template is operable, in such embodiments, for positioning aircraft fasteners to provide a specific engineering configuration, normal-to-surface alignment, tool mark protection and prevention from surface strikes, for fastener insertion into an aircraft structure.

Once the fasteners on the template are engaged with the device into which they are being installed, for example, an aircraft structure, the template may be removed, by pulling the polycarbonate sheet, and thus the grommets, over the fastener head. The fasteners are left in position for final installation. In one known installation, an end of the fastener opposite the fastener head, which partially extends through an installation surface, is pulled into final position by a device sometimes referred to as a huck puller.

The template provides a consistent engineering configuration, including, but not limited to, fastener location, type and grip. The described template also eliminates hand installation of fasteners, prevents fastener spillage during installation process, while holding fasteners in the correct alignment for installation into a surface, for example a surface of an aircraft. Bringing a large quantity of fasteners to bear at the point of installation increases efficiency of the fastener installation process.

Figure 1:
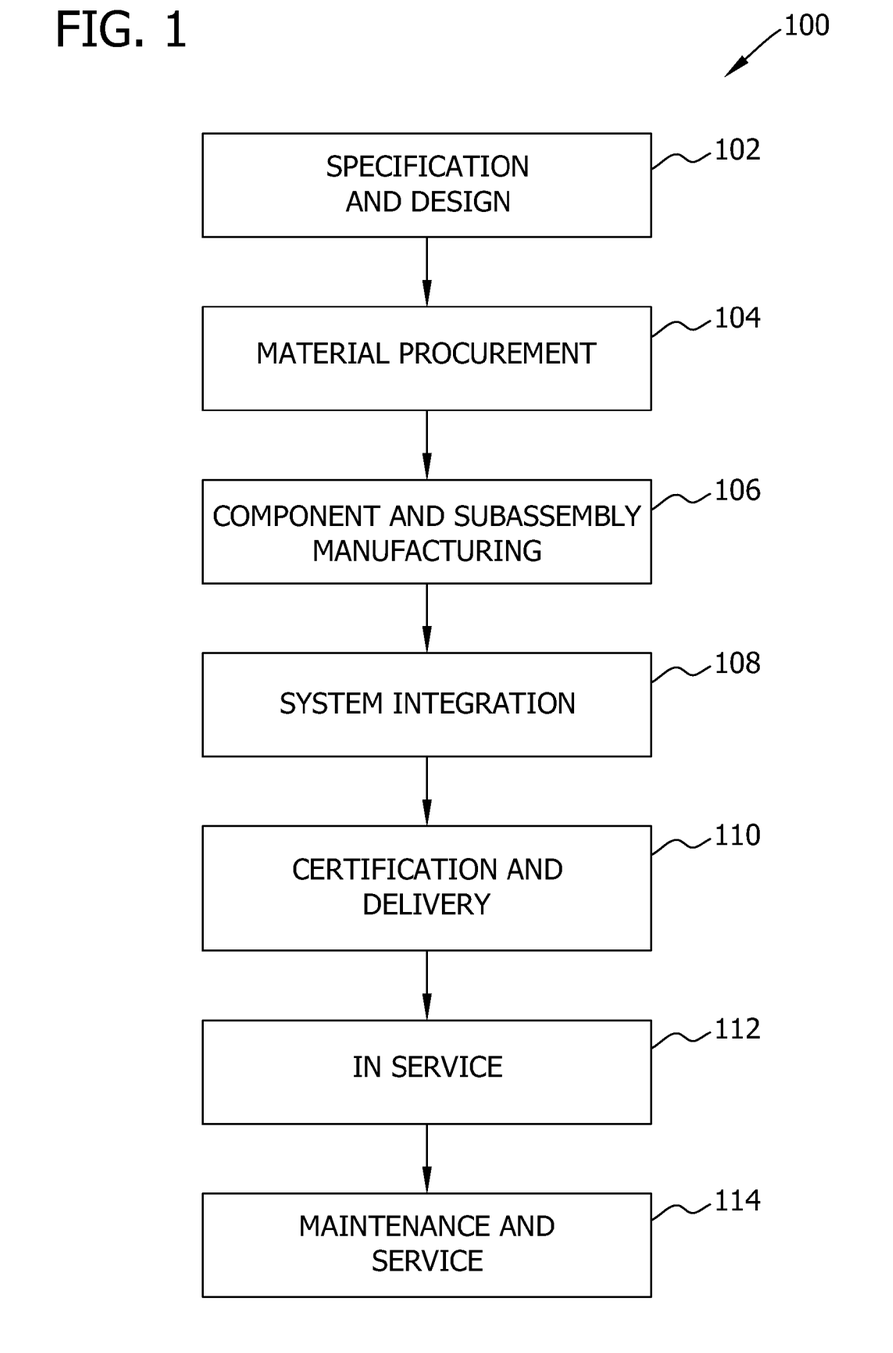
FIG. 1 is a flow diagram of an aircraft production and service methodology.
Figure 2:
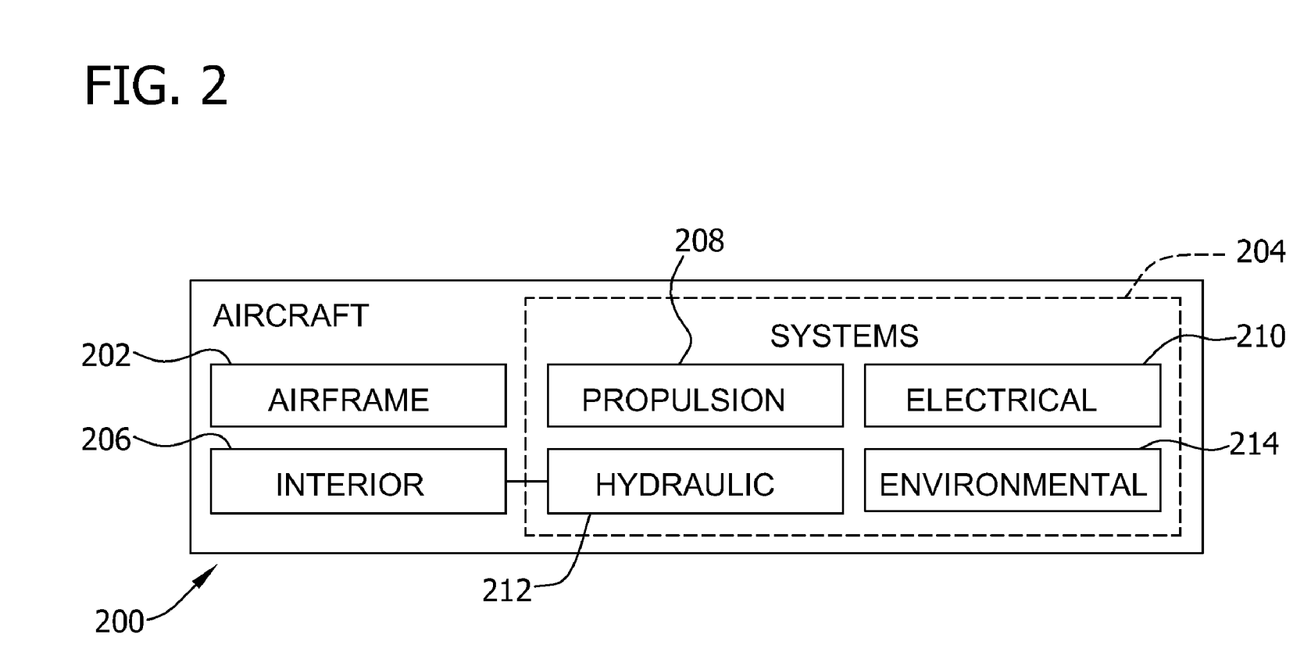
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
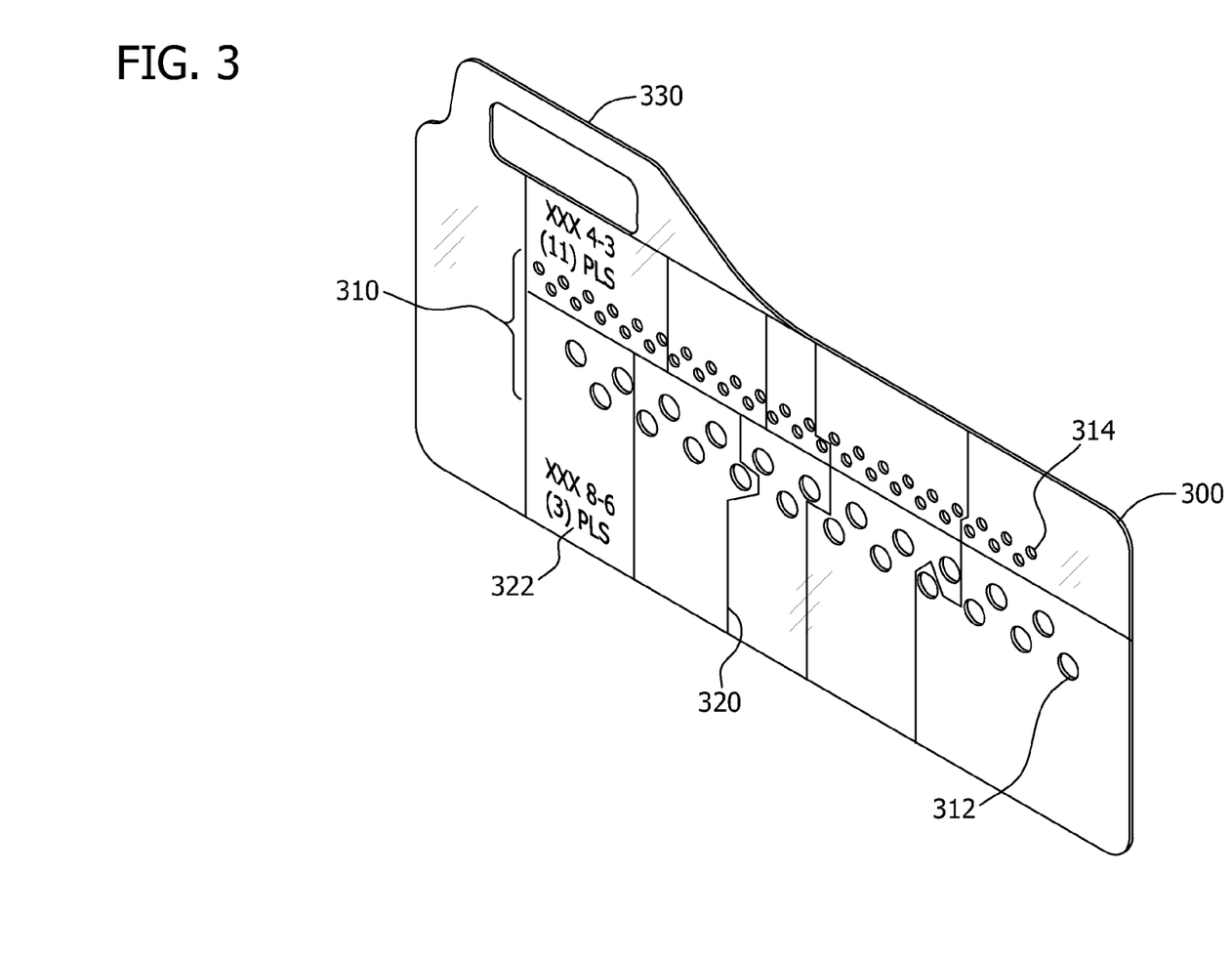
FIG. 3 is an illustration of a flexible sheet utilized as part of a fastener template.

Turning now to FIG. 3, a flexible sheet 300 utilized as part of a fastener template is shown. Flexible sheet 300 includes a user handle 302 formed therein which is useful for one or more of transport of the template and removal of template from the proximity of a surface after an initial fastener installation step is completed as further described below.

Flexible sheet 300 has a series of holes 310 formed therethrough. Holes 310 are positioned on template such that a pattern of holes 310 on template 300 matches (is centered on) the holes through a surface into which the corresponding fasteners are to be inserted. For a large scale fabrication, such as an aircraft, multiple different templates (flexible sheets 300) may be utilized, with each having a specific pattern of holes 310, the holes being aligned with holes in the surface in the corresponding area of the fabrication where the particular template is to be utilized. It is also possible that a plurality of templates, and therefore flexible sheets 300, may be utilized that have a duplicate hole pattern. Embodiments of flexible sheet 300 may include different fastener patterns as well as different fastener types as templates having differing configurations of hole patterns are contemplated, based on the fastener patterns associated with the device to be fabricated. As shown in FIG. 3, flexible sheets 300 may also include holes of differing sizes as illustrated by hole 312 and hole 314. Such holes may utilize grommets of differing sizes as further described below.

Embodiments of flexible sheet 300 may also include a series of lines 320 and markings 322 thereon. Markings 322, in one embodiment, are utilized to indicate to a user one or more of which grommets are associated with the holes and which fasteners are associated with the holes within the boundary defined by lines 320. Further marking may indicate a fastener length and/or a location on a structure being fabricated where the template is to be utilized. Only two examples of markings are shown in FIG. 3. One embodiment of a physical implementation of flexible sheet 300 includes markings for every section denoted by lines 320.

Figure 4:
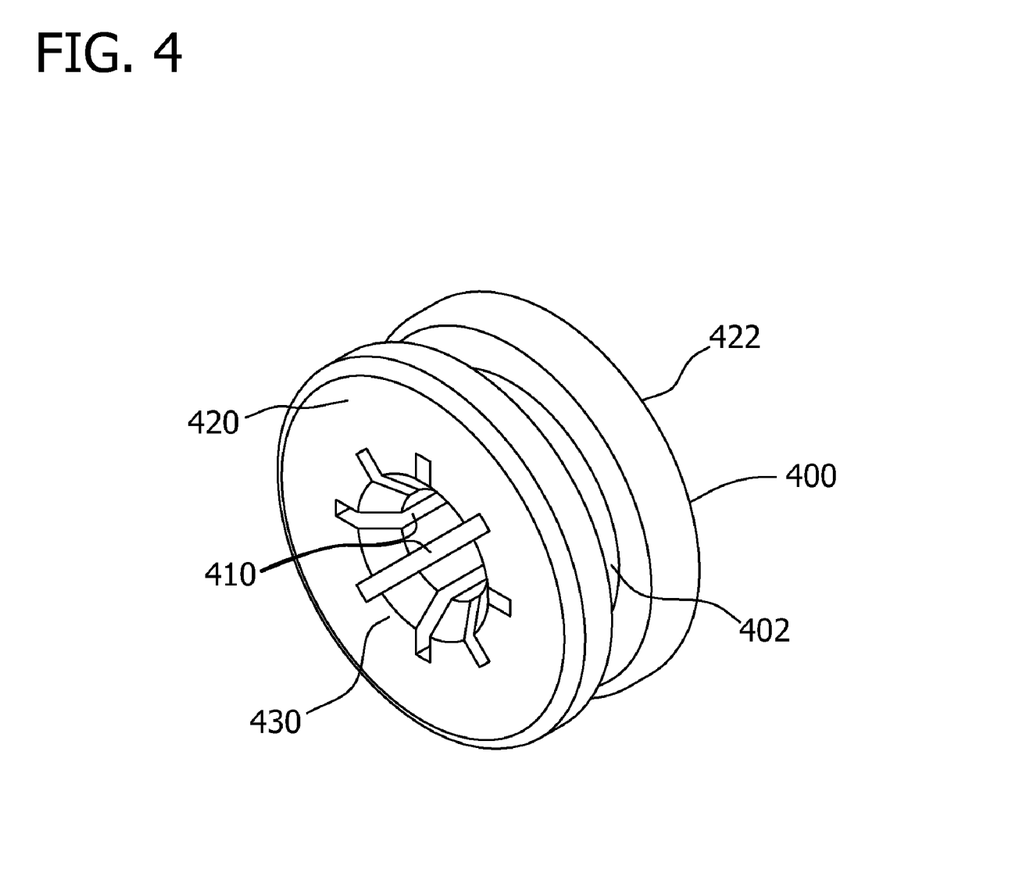
FIG. 4 is an illustration of a grommet which is insertable into the flexible sheet of FIG. 3.

FIG. 4 is an illustration of a grommet 400 which is insertable into the flexible sheet 300 of FIG. 3. As shown, grommet 400 includes an indented portion 402 which extends about a perimeter of grommet 400 which is useful in maintaining a position of grommet 400 when inserted into the appropriate hole of flexible sheet 300. Grommet 400 includes a plurality of slices 410 extending from a front 420 of grommet 400 to a back 422 of grommet 400 thereby forming a plurality of radial keyways 430. The keyways 430 in the material allow a head of a fastener to pass through the grommet 400 as the fastener template is removed from a surface where the fasteners have been at least partially installed. Though the slices 410 and keyways 430 are formed within the grommet 400, the keyways 430 of the grommet 400 maintain enough integrity to maintain a perpendicular orientation of a fastener inserted therein. In one embodiment, grommets 400 are fabricated using injection molding of the elastomeric material. In one specific embodiment, a thermoplastic vulcanizate plastic material, for example, Santoprene 8211-25 is utilized in grommet fabrication. Santoprene is a trademark of ExxonMobil Chemical. In another embodiment, a synthetic rubber, such as a urethane, is utilized in fabricating the grommets 400.

Figure 5:
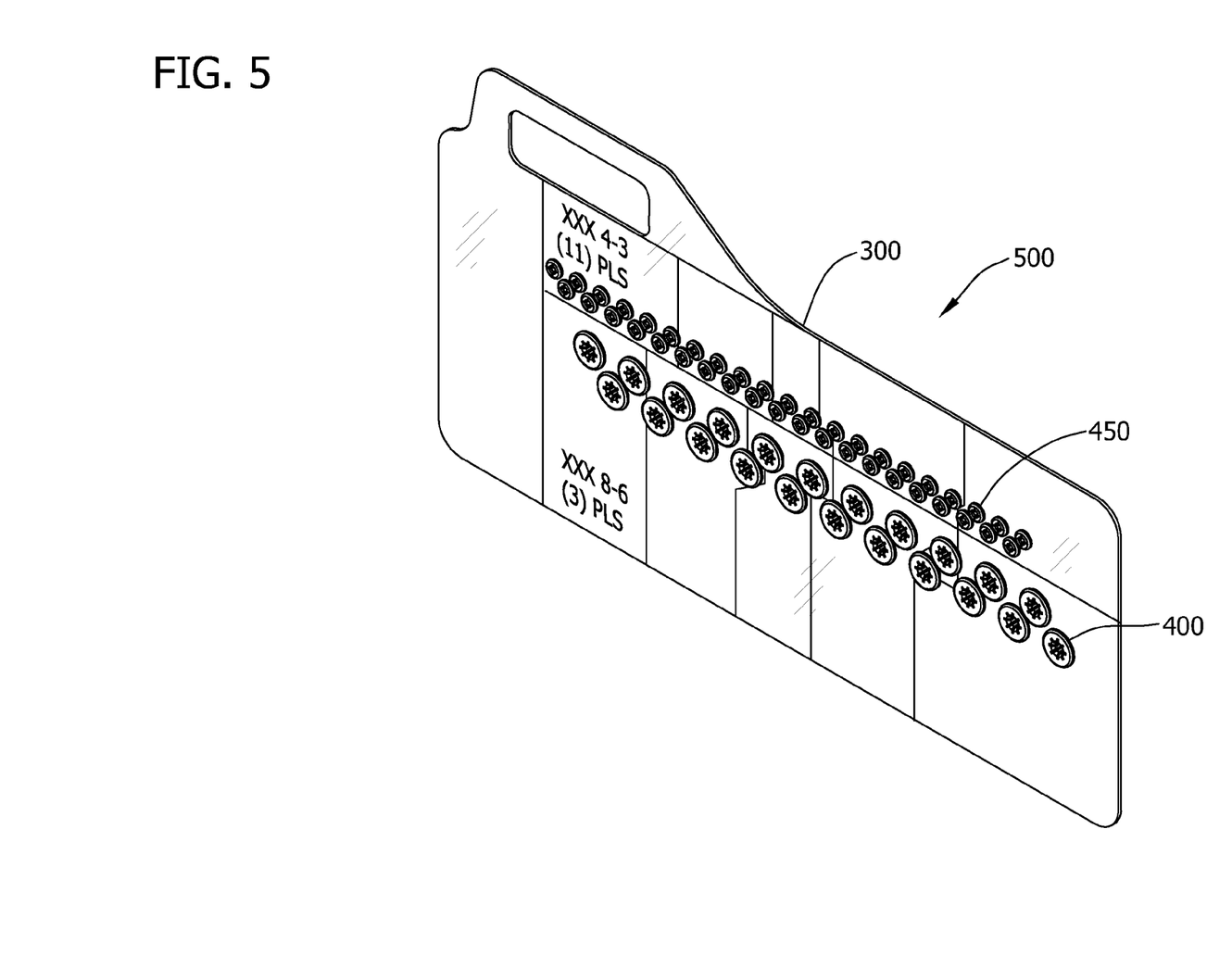
FIG. 5 is an illustration of a fastener template that includes a sheet with holes formed therein and grommets inserted into the various holes.

In one embodiment, grommets 400 are fabricated from an elastomeric material, such as described above, and are individually located in the flexible template 300 as shown in FIG.

5. FIG. 5 is an illustration of a fastener template 500 that includes flexible sheet 300 with holes formed therein and grommets 400 inserted into the various holes. Fastener template 500 includes grommets 400 and grommets 450 installed therein. Grommets 400 and 450 are similar except in size, and grommets 450 are shown in FIG. 5 to illustrate that a fastener template may be utilized with fasteners of various types and/or sizes. In such embodiments, the grommets and the hole in the flexible sheet are sized based on the fastener, and its associated fastener head, which is to be utilized in the particular location.

Figure 6:
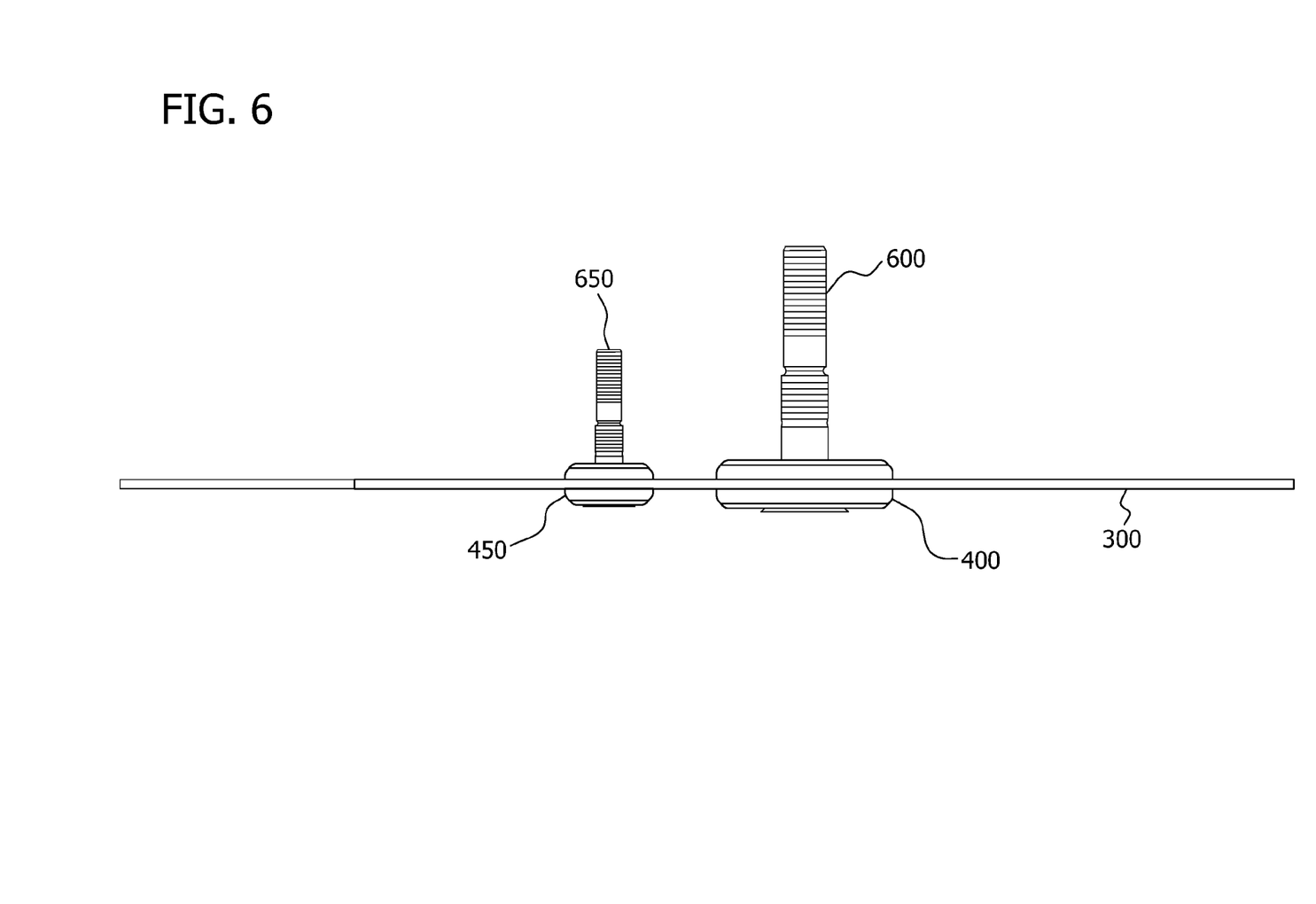
FIG. 6 is a side view of the fastener template illustrating fasteners extending through the holes in the flexible sheet and held in place by the grommets.

FIG. 6 is a side view of the fastener template 500 illustrating fasteners 600 and 650 extending through the corresponding holes in the flexible sheet 300 and held in place by the corresponding grommets 400 and 450. Unlike existing fastener templates, and referring to FIG. 6, grommets 400 and 450 operate to maintain the appropriately sized fasteners 600 and 650 in a perpendicular orientation with respect to the flexible template 300 in a fairly rigid manner. Such configuration allows the fasteners 600 and 650 to be seated substantially simultaneously into holes drilled and countersunk in, for example, an airframe. In embodiments, the locations of the holes in the flexible sheet 300 match the location of the holes in an engineering drawing, and the grommets 400 and 450 operate to hold and align the fasteners 600 and 650 with, and perpendicular to, the holes in the structure into which the fasteners 600 and 650 are to be inserted.

The fasteners 600 and 650 depicted in FIG. 6 are a standard aircraft manufacturing fastener, which operates utilizing an interference fit. In use, only a portion of the fastener is placed into the corresponding hole of the device being fabricated prior to removal of the template 500. Once the template is removed, the fasteners are pulled into the structure being fabricated using the end opposite the fastener head as is well known in the art. However, it is contemplated that other fastener types, for example screws, bolts and otherwise, may be utilized with the above described template and grommet combination.

Figure 7:
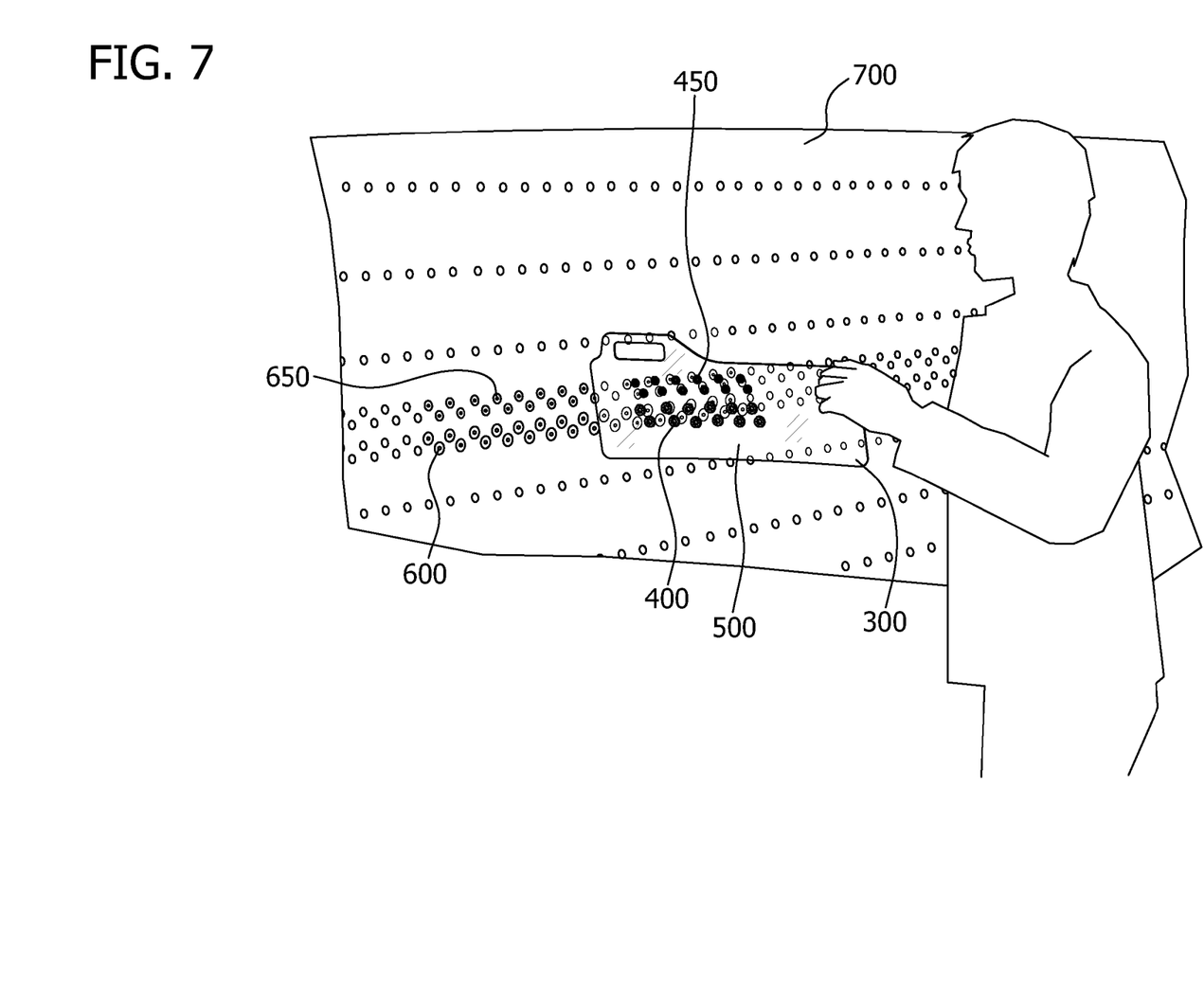
FIG. 7 is an illustration of the fastener template being removed after installation of fasteners through a surface.
Figure 8:
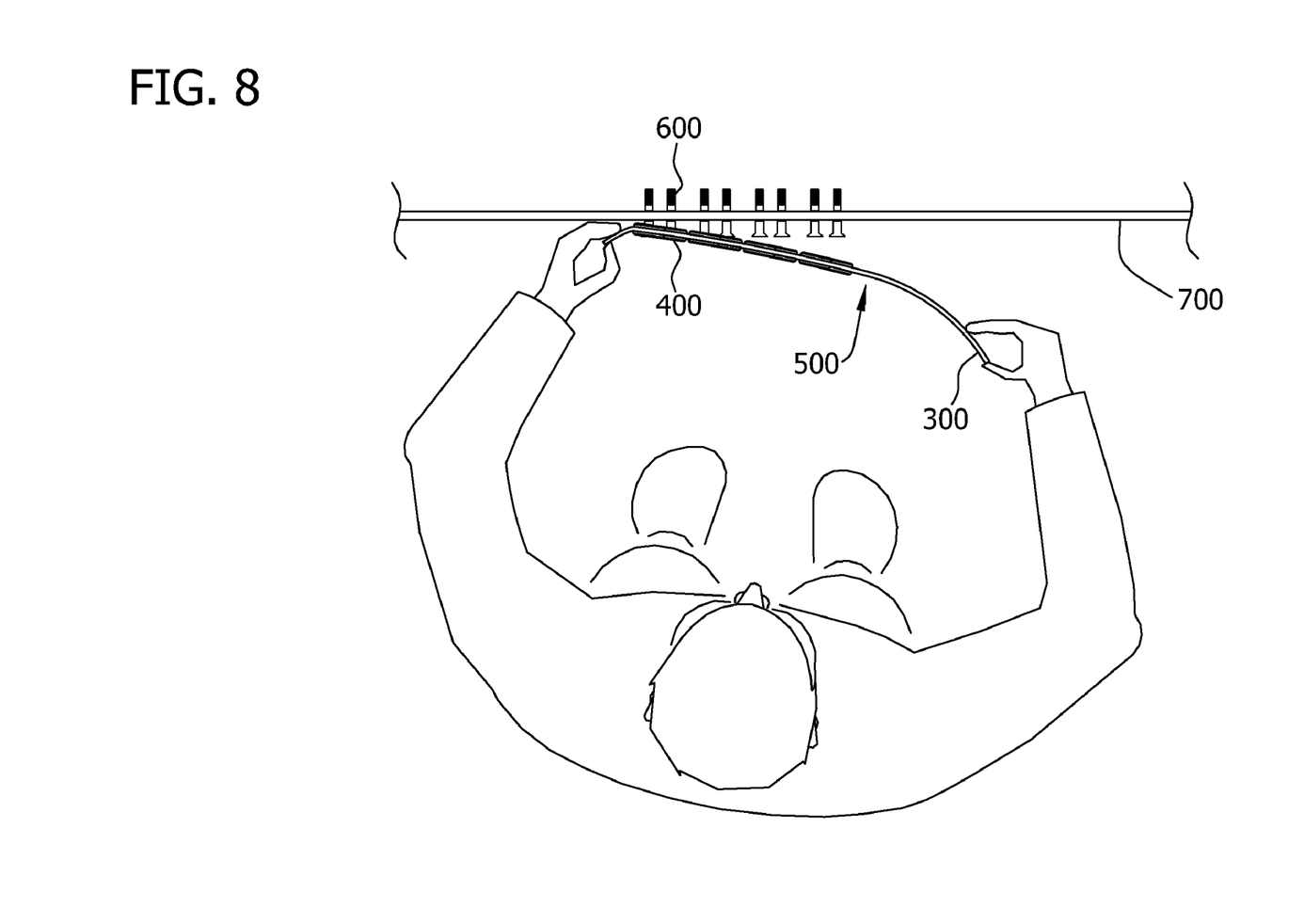
FIG. 8 is a top view further illustrating a user removing the template from the series of fasteners partially installed through a surface.

FIG. 7 is an illustration of the fastener template 500 being removed after installation of an end portion of fasteners 600 and 650 through a surface 700, grommets 400 and 450 remained installed in the flexible sheet 300 of fastener template 500. Once flexible sheet 300 is removed, the swaged and collared fasteners of the type illustrated in FIG. 6 are in place to be pulled into their final location. FIG. 8 is a top view further illustrating a user removing the template 500 from the series of fasteners.

As described above, the existing solution is a thin sheet of rubber sandwiched between two plastic sheets with fasteners poking through the rubber. Unfortunately, the fasteners inserted through this rubber sheet have a tendency to become angled during fastener placement and for the most part, are not normal to the surface to which they are to be inserted in a consistent enough manner to drive in fasteners without individually hand checking each fastener. These existing templates are generally configured by an engineering function, and the entire template has to be re-fabricated and released if a single fastener position becomes non-functional.

The embodiments described herein combine an engineering-configured template with hardware grommets that are typically in shop supply. Such a configuration ensures the entire tool is not out of service if the grommet associated with a particular fastener position wears out. A worn out grommet is simply replaced. A typical fastener template, as shown in FIGS. 3, 5, 7, and 8, typically includes 50-80 fastener positions, meaning wear and tear of grommets is likely. As is also described above, utilization of grommets 400 and 450 within fastener template 500 allows for precise placement of fasteners 600 and 650 in a normal-to-surface orientation. As a result, fastener template 500 is more suited to seating multiple rows and a larger number of fasteners at one time.

The described embodiments are easier to maintain than the above described currently utilized solution, and further provide the capability to introduce a new fastening process which will result in a more efficient and ergonomic process. The maintenance benefit is that the grommets are removable from the flexible sheet 300, allowing for the repair of fastener template 500 (e.g., grommets 400 and 450 can replaced in the shop or at the supplier) without engineering intervention. A new fastening process is realized by the normal-to-surface condition of the fasteners, which allows multiple fasteners 600 and 650 to be seated into the device in which they are utilized (e.g., an aircraft skin), though not flush, at the same time using a multiple fastener seating die.

In addition, grommets 400 provide protection between device and fastener, virtually eliminating tool marks. For example, on the side of an aircraft skin opposite fastener template 500, a fastener puller allows pull through of a fastener head through a seated grommet and virtually eliminates tool marks on the side associated with the fastener head. A collar swaging device allows swaging of the collar. The mechanic is no longer hand feeding fasteners and individually seating the fasteners with a rivet die. Such a process saves on time, waste, accuracy, defects and injuries.

The described embodiments result, when using interference fit fasteners, in a two-step swaging procedure. The two-step swaging procedure includes using a fastener puller to pull the fastener flush to the surface of the structure being assembled, and swaging a collar to the fastener, for those fasteners that utilize a collar.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Apparatus for positioning of fasteners normal to a surface through which the fasteners are to be inserted, said apparatus comprising:
   a sheet material comprising a plurality of holes therethrough, said holes positioned to correspond with bores through the surface through which the fasteners are to be inserted; and
   a plurality of grommets operable for mounting in said holes in said sheet, said grommets each comprising:
      a hole centered therein and sized such that said grommet will support a fastener placed therein; and
      a plurality of radial keyways extending from said centered hole, said keyways having a specific radial depth to provide finger tabs at said centered hole to maintain support of the corresponding fastener normal to said sheet.

2. Apparatus according to claim 1 wherein said sheet material is flexible.

3. Apparatus according to claim 1 wherein said sheet material comprises plastic.

4. Apparatus according to claim 1 wherein said grommets comprise an elastomeric material.

5. Apparatus according to claim 1 wherein said centered hole and said radial keyways are sized to allow pull through of a fastener head when the fastener is axially seated against the surface corresponding with the bores.

6. Apparatus according to claim 1 wherein said sheet material comprises indicia thereon proximate each of said holes, said indicia indicative of at least one of a particular said grommet and a particular fastener to be utilized with said hole.

7. Apparatus according to claim 1 wherein said sheet material comprises a handle formed therein.

8. Apparatus according to claim 1 wherein said grommets comprise molded grommets, said grommets molded to form said keyways.

9. A method for installing fasteners into an assembly, the assembly including a plurality of bores formed therein in a specific orientation with respect to one another into which the fasteners are to be inserted, said method comprising:
   placing individual fasteners into corresponding ones of a plurality of grommets, the grommets installed into holes formed in a flexible sheet material, the plurality of grommets alignable with the plurality of bores, the grommets and flexible sheet material forming a template;
   at least partially engaging each fastener with a corresponding bore in the assembly; and
   removing the template such that heads associated with the fasteners pass through the corresponding grommet, leaving the individual fasteners in position for final installation into the assembly.

10. The method according to claim 9 further comprising pulling each individual fastener into position from an end opposite the head associated with each individual fastener.

11. The method according to claim 9 wherein removing the template comprises pulling the flexible sheet material away from the partially engaged fasteners.

12. The method according to claim 9 wherein removing the template comprises utilizing keyways formed in the grommets to allow the fastener heads to pass through, the keyways having a specific radial depth to maintain support of the corresponding fastener normal to the flexible sheet material.

13. The method according to claim 9 wherein placing individual fasteners into corresponding ones of a plurality of grommets comprises at least one of:
   utilizing markings on the flexible sheet material to identify a particular grommet type for placement into a corresponding hole in the flexible sheet material; and
   utilizing markings on the flexible sheet material to identify a particular fastener type for placement into a corresponding grommet in the flexible sheet material.

14. The method according to claim 9 further comprising forming the flexible sheet material to include a handle therein.

15. A fastener positioning apparatus comprising:
   a sheet material comprising a plurality of holes therethrough, said holes positioned to correspond with bores through the surface through which the fasteners are to be inserted; and
   a plurality of grommets operable for mounting in said holes in said sheet, said grommets each comprising a hole centered therein, said centered hole sized such that each said grommet will support a fastener placed therein in a position substantially normal to said sheet.

16. The fastener positioning apparatus according to claim 15 wherein said grommets further comprise a plurality of radial keyways extending from said centered hole, said keyways having a specific radial depth to provide finger tabs at said centered hole to maintain support of the corresponding fastener normal to said sheet.

17. The fastener positioning apparatus according to claim 16 wherein said centered hole and said radial keyways are sized to allow pull through of a fastener head when the fastener is axially seated against the surface corresponding with the bores.

18. The fastener positioning apparatus according to claim 15 wherein said sheet material comprises plastic.

19. The fastener positioning apparatus according to claim 15 wherein said grommets comprise an elastomeric material.

* * * * *